United States Patent [19]

McLoughlin

[11] Patent Number: 4,849,144

[45] Date of Patent: Jul. 18, 1989

[54] PROCESS FOR MAKING A SEPARATOR FOR AN ELECTROCHEMICAL DEVICE

[75] Inventor: Robert H. McLoughlin, Swindon, United Kingdom

[73] Assignee: Scimat Limited, Swindon, England

[21] Appl. No.: 90,399

[22] Filed: Aug. 27, 1987

Related U.S. Application Data

[62] Division of Ser. No. 884,131, Jul. 10, 1986, abandoned.

[30] Foreign Application Priority Data

Jul. 11, 1985 [GB] United Kingdom ............... 8517571

[51] Int. Cl.⁴ .................... C08J 9/28; C08J 9/26; B29C 47/06
[52] U.S. Cl. ........................ 264/45.9; 156/244.11; 264/41; 264/49; 264/154; 264/288.8; 429/249
[58] Field of Search ................. 264/41, 49, 154, 288.8

[56] References Cited

U.S. PATENT DOCUMENTS

| | | | |
|---|---|---|---|
| 3,351,495 | 11/1967 | Larsen et al. | 264/41 X |
| 3,929,950 | 12/1975 | Nakamura et al. | 264/49 |
| 4,176,148 | 11/1979 | Magder et al. | 264/154 X |
| 4,190,707 | 2/1980 | Doi et al. | 264/49 X |
| 4,278,741 | 7/1981 | Kalnoki-Kis | 429/48 |
| 4,287,276 | 9/1981 | Lundquist, Jr. et al. | 429/206 |
| 4,327,164 | 4/1982 | Feinberg et al. | 429/144 |
| 4,331,746 | 5/1982 | Sheibley | 429/144 |
| 4,335,193 | 6/1982 | Doi et al. | 429/251 |
| 4,517,315 | 5/1985 | Matsumura et al. | 264/49 X |
| 4,613,643 | 9/1986 | Nakamura et al. | 524/426 |
| 4,615,961 | 10/1986 | Park et al. | 429/218 |
| 4,698,372 | 10/1987 | Moss | 264/41 X |
| 4,704,238 | 11/1987 | Okuyama et al. | 264/41 |

FOREIGN PATENT DOCUMENTS

| | | |
|---|---|---|
| 0143562 | 6/1985 | European Pat. Off. . |
| 0143566 | 6/1985 | European Pat. Off. . |
| 0146246 | 6/1985 | European Pat. Off. . |
| WO84/03177 | 8/1984 | PCT Int'l Appl. . |
| 0059285 | 10/1981 | United Kingdom . |
| 0146245 | 11/1984 | United Kingdom . |

*Primary Examiner*—Philip Anderson
*Attorney, Agent, or Firm*—Simon J. Belcher; Herbert G. Burkard

[57] ABSTRACT

A polymeric component, for use as a separator in an electrochemical device in which the anode comprises metallic lithium, comprises a thermoplastic polymer, a tertiary plasticizer and a filler that comprises a lithium compound which is substantially insoluble in both the polymer and the plasticizer. The component is rendered porous by deformation which increases its surface area. The porosity can be enhanced by extracting one or both of the plasticizer and the filler.

14 Claims, 2 Drawing Sheets

PROCESS FOR MAKING A SEPARATOR FOR AN ELECTROCHEMICAL DEVICE

This application is a division of application Ser. No. 884,131, filed July 10, 1986 now abandoned.

The present invention relates to a polymeric component, in particular, to a component for use as an electrode separator in an electrochemical device, such as an electrochemical cell, which employs a lithium anode.

To minimise the risk of formation of internal short circuits in electrochemical devices such as electrochemical cells, it is common practice to position a thin porous layer of material between the electrodes as a separator. The porosity of the separator should be carefully controlled since it affects directly the internal resistance of the cell. Several methods are available for the manufacture of separators. For example, separators may be constructed from woven, meshed or otherwise interlaced fibres such as glass fibres, or they may be made from sheets of polymeric material (produced for example by solvent casting or by extrusion) which can be rendered porous, either physically for example by stretching or perforation, or chemically by removal of a component from the material. For example separators for use in storage batteries which employ acid or alkaline electrolytes are disclosed in U.S. Pat. No. 3,351,495. The separators comprise a polymer composition which contains a polyolefin, a plasticiser and inert filler material that is insoluble in the plasticiser. After forming the composition into a sheet, at least some of the filler and/or the plasticiser is extracted.

In a first aspect, the invention provides a polymeric component for use as a separator for an electrochemical device, the component comprising a thermoplastic polymer, a tertiary plasticiser and a filler that comprises a lithium compound which is substantially insoluble in both the polymer and the plasticiser.

In another aspect, the invention provides a process for making a separator for an electrochemical device, the method comprising blending together a thermoplastic polymer, a tertiary plasticiser, and a filler which comprises a lithium compound which is substantially insoluble in the polymer, forming a lamina of the composition, and deforming the lamina to render it porous.

Figure 1:
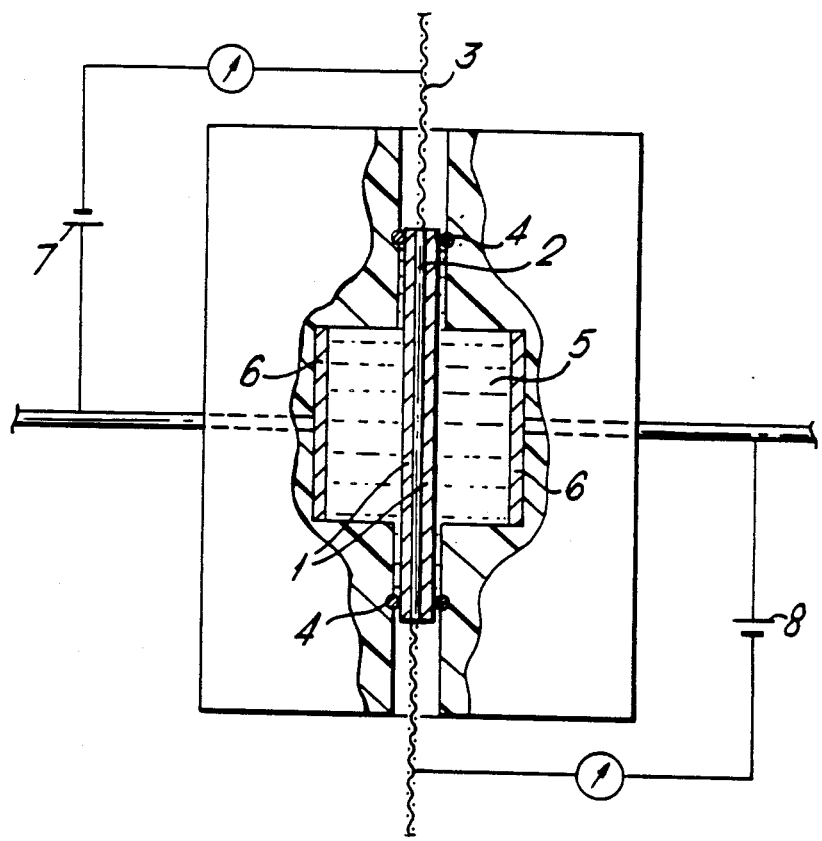
FIG. 1 is a conductivity cell having a sample lamina as part of the cell.
Figure 2:
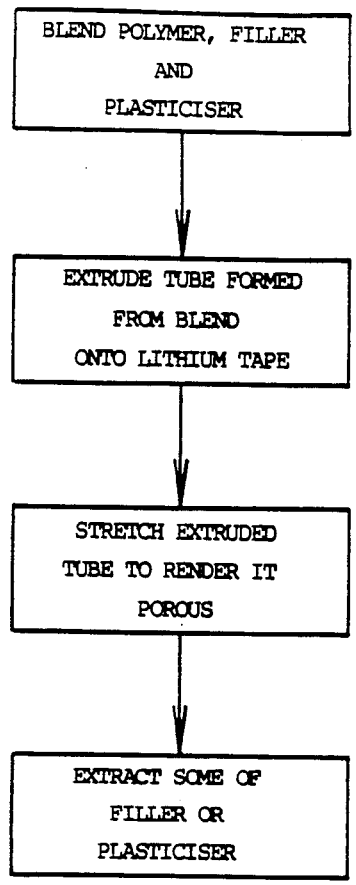
FIG. 2 is a flow sheet of the claimed process.
Figure 3:
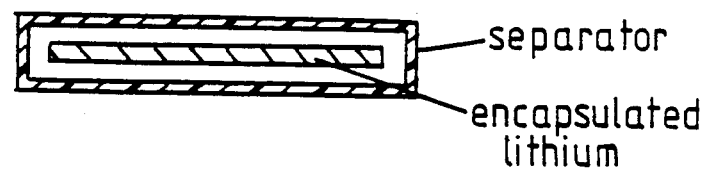
FIG. 3 shows a lithium component encapsulated by separator material.

The selection of a lithium compound as the inert filler of the component renders the component suitable for use as a separator in many types of electrochemical device. Hitherto, the problem of ensuring electrochemical compatibility between the metal of the anode and the cationic component of a filler incorporated in the separator has been overcome by careful choice of a filler to be compatible with the cell component. Separators formed from a component of this invention may however be used in many types of cell, without risk of reaction between the anode material and the cationic component of the filler, and are particularly attractive for use in lithium cells because of the high energy density and high power output which they can offer.

The filler is selected to be insoluble in the thermoplastic polymer so that the filler particles remain substantially intact in the polymer matrix and create pore sites therein. Preferably, the filler is selected also to be insoluble in liquid with which the separator comes into contact when incorporated into a device, such as the electrolyte. Such an insoluble filler will not affect the physical characteristics of the electrolyte such as its viscosity, or conductivity, as can happen in the case of separators containing soluble fillers such as soluble salts and soluble polymers.

The plasticiser used in the component is a tertiary plasticiser. The term "tertiary plasticiser" encompasses plasticisers which are substantially immiscible with the thermoplastic polymer in the absence of the filler. In the composition of the present component, without being limited to any particular theory, it is believed that there is an interaction between the plasticiser and the surfaces of the filler particles which results in the filler particles being encapsulated in a layer of the plasticiser. The material of the plasticiser will preferably be substantially electrochemically inert towards the other cell components and will not affect the other components physically. Beneficial interactions are not, however, excluded; for example, the plasticiser may be relied on to improve the processability of the composition of the component.

Porosity in a piece such as a strip, sheet or film of the component may be achieved in any of a number of ways. The coating of plasticiser around the filler particles modifies the interactions between the filler and the surrounding polymer matrix, and allows pores to be created in the pore sites defined by the filler particles by deformation of the component, particularly by stretching. In contrast to components consisting essentially of polymer and filler particles which are made porous solely by stretching to cause fibrillation of the polymer matrix, the provision of plasticiser allows greater control to be placed over the pore forming process. This can provide the significant advantage of a more reproducible electrochemical performance.

The extent to which the polymeric component is deformed depends on many factors, including, for example, the nature of the polymer, plasticiser and filler, whether the plasticiser and/or the filler are to be extracted from the pores, the required pore size etc. Generally, a high degree of deformation will be preferred, to create a high degree of fibrillation and therefore a relatively high porosity; in practice, the degree of deformation will be as high as possible without causing physical damage, such as rupture, to the component. Prefrably, the component is stretched so that the dimension in the direction of stretching increases by at least 50%, more preferably at least 100%, especially at least 250%, ideally at least 450%. By this process, the thickness of th component can be reduced by a factor of five or more. Deformation to such an extent is possible with components which comprise substantial amounts of filler, for example from 150 to 300 parts by weight of filler per hundred parts of thermoplastic polymer, without physical damage to the component. This surprising effect is believed to arise from the presence of relatively small amounts of tertiary plasticiser in the composition of the component, and thus allows relatively thin porous components to be made by convenient processes.

An alternative to the step of deforming the polymer, or in addition thereto, the porosity of the separator may be increased by extraction of at least some of the plasticiser or the filler or both from the polymer component. The extraction may be carried out before assembly of the cell using an independent solvent, or after assembly of the cell by means of liquid with which the separator comes into contact when incorporated into the cell, such as the electrolyte, or in the case of a lithium/oxyhalide cell, the liquid oxyhalide. It is preferred to extract the plasticiser from a deformed component which results in the filler particles being left in pores which are substantially larger than the particles themselves. This is believed to reduce significantly collapse of the pores when the separator is in use. Furthermore, thorough wetting of the separator by the electrolyte is believed to be enhanced by residual filler. It is advantageous to stretch the component prior to extraction of the plasticiser or filler since extraction from the elongated pores can be more efficient than that from the unstretched sheet.

From the above, it will be clear that the size of the pores in the component will be influenced to a large extent by the size of the filler particles. This factor will also influence the minimum thickness of a component that can be made from a particular component. For many applications, it is preferred that the size of the filler particles is generally less than 20 micrometers, preferably less than 15 micrometers, more preferably less than 8 micrometers, especially less than 5 micrometers. The component preferably has a laminate form. For example it may have the form of a strip or a sheet. Preferably the thickness of the lamina prior to deformation is less than 450 micrometers, more preferably less than 350 micrometers, especially less than 150 micrometers. Surprisingly, despite relatively high filler loadings, such as between 150 and 300 parts by weight per hundred parts of polymer, it has been possible to form such thin components by melt processing techniques such as extrusion with satisfactory uniformity and homogeneity. After deformation, the component preferably has a thickness of less than 75 micrometers, especially from 25 to 50 micrometers.

The thermoplastic polymer of the component may be a polymer of a compound with one or more polymerisable double bonds, or a condensation polymer of a condensable compound.

Useful polymer of compounds with polymerisable double bonds may be selected from polymers of ethylenically unsaturated hydrocarbons having 2 to 12 carbons, such as ethylene, propylene, n-hexylene, n-dodecene or 4-tert butylstyrene and of vinyl ethers such as methyl or ethyl vinyl ether. Preferred among these compounds are polyethylene and polypropylene due to their low cost.

Copolymers of the above monomeric compounds may also be used.

Useful condensation polymers may be selected from self-condensates of omega-amino-fatty acids and their lactams, such as condensation polymers from caprolactam and from 11-amino-undecanoic acid.

The condensation polymers can be polyamides of diamines having 6 to 9 carbons and dicarboxylic acids having 6 to 10 carbons. Typical useful diamines include hexamethylenediamine, nonamethylenediamine and aryldiamines such as m- and p-phenylenediamine. Typical useful dicarboxylic acids include adipic acid, suberic acid, azelaic acid, terephthalic acid and isophthalic acid. The preferred polyamide is the condensate of hexamethylenediamine and adipic acid, for reasons of general availability.

The condensation polymers can also be selected from polyesters of arylidcarboxylic acids such as phthalic, terephthalic and isophthalic acids and glycols having 2 to 6 carbons, such as ethylene, butylene- and hexyleneglycols.

Useful polymers include:
Ethylene/tetrafluoroethylene copolymer (Tefzel Trade Mark)
Ethylene/chlorotrifluoroethylene copolymer
Poly(2-methylpropene)
Polypropylene
Polyethylene
Poly(4-tert-butylstyrene)
Poly(vinyl methyl ether)
Poly(6-aminocaproic acid)
Poly(11-aminoundecanoic acid)
Poly(ethyleneterephthalate)
Poly(decamethylene sebacamide)
Poly(heptamethylene pimelamide)
Poly(octamethylene suberamide)
Poly(nonamethylene azelaamide)
Poly(hexamethylene adipamide)

Optionally, the polymeric composition may be cross-linked, for example, by means of a chemical cross-linking agent or physically by irradiation with high energy electrons.

According to the invention, it has been found that lithium compounds are most appropriate for use as the filler of the component, since they confer a versatility on the component, allowing it to be used as a separator in a range of electrochemical devices without risk of chemical degradation. Lithium salts are preferred, in particular, lithium salts which are insoluble in the cell electrolyte. Particularly preferred lithium salts include the carbonate, phosphate and aluminate, although other lithium compounds may be used, such as the nitrate, sulphate, trifluoromethylsulphonate, tetrafluoroborate and other salts.

The selection of the plasticiser will generally be influenced by the materials chosen for the thermoplastic polymer and the filler, since the interactions between the plasticiser and the polymer and filler are of importance. The choice of plasticiser may also be influenced by the cell electrolyte and the desired solubility of the plasticiser in the electrolyte.

Examples of tertiary plasticisers which may be used in the composition of the invention include ethylene carbonate, propylene carbonate (PC), ethylene glycol dimethylether (DME), tetrahydrofuran, dimethylformamide and dimethylsulphoxide. Other plasticisers which may be used include triglyme, tetraglyme, and selected polyethylene oxides and polyethylene glycols. Solvents which are suitable for extracting the plasticiser, when that is desired, will be apparent to those skilled in the art. As an example, ethylene glycol dimethyl ether may be used as a solvent to extract propylene carbonate when used as a plasticiser.

It will be understood that in some circumstances, it will be appropriate to add certain other ingredients to the composition of the component, such as antioxidants, UV stabilisers, processing aids, dispersal aids, cross-linking agents and so on. It is particularly preferred to add to the composition a dispersal aid, preferably a salt of a fatty acid. The salt will generally be selected to be electrochemically compatible with other components which the separator will encounter when incorporated into a device. In the case of a device which comprises a lithium anode, the lithium salt of the fatty acid will be preferred. Stearates are the preferred fatty acid salts. The stearate may for example be added directly to the polymer composition or produced by reaction between the filler and stearic acid. The quantity of dispersal aid added to the composition will be determined by the quantity of plasticiser. Preferably the ratio by weight of plasticiser to dispersal aid is from 1:1 to 15:1, more preferably from 3:1 to 12:1, especially about 10:1.

It is convenient to express the proportions of the major constituents of the composition in terms of parts by weight per hundred parts of thermoplastic polymer. Prior to extraction of one or more of the constituents, it is preferred that the composition comprises from one to 50, preferably from 5 to 15 parts by weight of plasticiser per hundred parts of polymer, and from 50 to 350, preferably from 150 to 300 parts by weight of filler per hundred parts of polymer.

The composition may be blended by conventional polymer blending apparatus such as a twin screw extruder or a two-roll mill. As stated above, the component preferably takes the form of a thin strip or sheet; more preferably, it is made in this form by extrusion, although blow and compression moulding techniques are alternatives. The optional step of subsequently deforming the resulting strip may be relied on to obtain a component of desired thickness. Having been formed into a lamina of suitable thickness, the component may be cut into pieces of suitable size, or may be formed into a roll for ease of transportation and storage.

The component may be used to protect a lithium or other metal anode prior to assembly of an electrochemical device, for example by encapsulation of the anode. The use of a separator to protect reactive metal anodes is disclosed in EP-A-143562, EP-A-143566 and EP-A-146246. Thus, for example, the lithium and the component may be co-extruded and the lithium stretched to form a thin web while protected by, and in contact with, the component. Alternatively, the component may be extruded as a loose coating on to a lithium or other metal foil by passing the foil through a crosshead die on the extruder; the component may then be deformed to render it porous, either with or without deformation of the metal.

Examples of polymeric components, and details of their manufacture, will now be described. The conductivity of each of the components was evaluated as follows, referring to the accompanying drawing which shows schematically, a conductivity cell:

In FIG. 1a sample of a lamina of polymer 1 with connections to the lithium 2 made by pieces of nickel mesh 3 was sealed in the conductivity cell by O-rings 4. The specified electrolyte solution was added and the conductance of the polymer was measured on both sides of the lithium using electrodes 6 and conductance bridges 7,8.

EXAMPLE 1

A porous polymeric component was formed by melt blending, on a 2 roll mill, 100 parts, by weight, of a linear medium density polyethylene (Sclair 8405 from Dupont) with 200 parts, by weight, of lithium carbonate which had previously been ground and air classified to a maximum particle size of 5 micrometers. After removal from the mill the blend was allowed to cool to room temperature prior to being granulated and tumble blended, for 1 hour, with 30 parts, by weight, of propylene carbonate.

This material was fed into the feed section of a 32 mm (25:1 LD ratio) single screw extruder, operating at a temperature of 150° C. and melt extruded by a crosshead as a thin wall tube having a diameter of approximately 9 mm. After cooling, to below the crystalline melting temperature of the polyethelene, the tube was stretched, in the machine direction, by 450%.

A length of lithium foil, 5.84 mm wide by 0.51 mm thick was inserted inside the resulting thin wall, 35 micrometers thick, porous tube and its resistance measured using the conductivity cell as described above. The specific resistance of the porous material was found to be 9.5 $\Omega cm^2$ when measured in a 1 molar solution of $LiClO_4$ in 50/50 PC/DME.

EXAMPLE 2

A compound mix manufactured and tested as previously described but with 225 parts of $Li_2CO_3$ and 32 parts of Triglyme per 100 parts of polyethylene had a specific resistance of 7.5 $\Omega cm^2$.

EXAMPLE 3

A compound mix manufactured and tested as previously described but with 250 parts of $Li_2CO_3$, 35 parts of Triglyme and 3.5 parts of lithium stearate per 100 parts of polyethylene had a specific resistance of 2.5 $\Omega cm^2$ when made with a wall thickness of 50 micrometers.

EXAMPLE 4

A compound mix, as described in example 3, was extruded as a loose coating on to a lithium foil by drawing the foil through the extruder crosshead. The coating was then made porous by stretching it in the machine direction without deforming the lithium, to a wall thickness of 35 micrometers. Its specific resistance, measured as previously described, was found to be 2.4 $\Omega cm^2$.

EXAMPLE 5

A compound mix manufactured and tested as described in example 3 but with 18 parts of propylene carbonate per 100 parts of polyethylene had a specific resistance of 6 $\Omega cm^2$ when made with a wall thickness of 100 micrometers.

EXAMPLE 6

A compound mix, manufactured and tested as described in example 1 but with 350 parts of $Li_2CO_3$ and 45 parts of Triglyme per 100 parts of polyethelene, was found to have a specific resistance of 2.5 $\Omega cm^2$ when made with a wall thickness of 200 micrometers.

I claim:

1. A process for making a separator for an electrochemical device, comprising the steps of blending together a thermoplastic polymer, a tertiary plasticiser, and a filler which comprises a lithium compound which is substantially insoluble in the polymer, the blend comprising from 1 to 50 parts by weight of plasticizer and from 150 to 350 parts by weight of filler per hundred parts of polymer; forming the blend into a film; and stretching the film to render it porous.

2. A process as claimed in claim 1, wherein the film is stretched by at least 100%.

3. A process as claimed in claim 1, wherein the film is stretched by at 250%.

4. A process as claimed in claim 1, wherein the blend is formed into the film by extrusion.

5. A process as claimed in claim 1, further comprising the step of extracting the plasticizer from the film.

6. A process as claimed in claim 5, wherein the extraction step is performed after the stretching step.

7. A process as claimed in claim 1, further comprising the step of extracting the filler from the film.

8. A process as claimed in claim 1, wherein the thermoplastic polymer is a polyolefin.

9. A process as claimed in claim 1, wherein the thermoplastic polymer is polypropylene or polyethylene.

10. A process as claimed in claim 1, wherein the particle size of the filler is less than 8 micrometers.

11. A process as claimed in claim 1, wherein the filler comprises lithium carbonate, lithium phosphate, or lithium aluminate.

12. A process as claimed in claim 1, in which the film is applied to a body of reactive metal so as to protect it.

13. A process as claimed in claim 12, wherein the reactive metal comprises lithium metal.

14. A process as claimed in claim 12, in which the film is applied to the body of reactive metal so as to encapsulate it.

* * * * *